US007527039B2

(12) United States Patent
Yamamura et al.

(10) Patent No.: US 7,527,039 B2
(45) Date of Patent: May 5, 2009

(54) FUEL INJECTION CONTROL APPARATUS OF INTERNAL COMBUSTION ENGINE

(75) Inventors: Yoshiya Yamamura, Kariya (JP); Yoshiyasu Ito, Toyota (JP)

(73) Assignees: Kabushiki Kaisha Toyota Jidoshokki, Kariya-Shi (JP); Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 11/983,486

(22) Filed: Nov. 8, 2007

(65) Prior Publication Data

US 2008/0140299 A1 Jun. 12, 2008

(30) Foreign Application Priority Data

Nov. 9, 2006 (JP) ............................ 2006-304288

(51) Int. Cl.
*F02D 41/34* (2006.01)
*G01M 15/06* (2006.01)

(52) U.S. Cl. ....................... 123/476; 701/105; 73/117.3

(58) Field of Classification Search ................. 123/476, 123/478, 480; 701/105; 73/117.3
See application file for complete search history.

(56) References Cited

U.S. PATENT DOCUMENTS 7,305,871 B2 * 12/2007 Arita et al. ............... 73/117.03

FOREIGN PATENT DOCUMENTS

| | | |
|---|---|---|
| JP | 61-234252 | 10/1986 |
| JP | 8-254138 | 10/1996 |
| JP | 2001-200747 | 7/2001 |
| JP | 2002-303199 | 10/2002 |
| JP | 2005-315107 | 11/2005 |

OTHER PUBLICATIONS

Japanese Office Action dated Nov. 4, 2008, received in corresponding Japanese Patent Application No. 2006-304288 without English translation.

* cited by examiner

*Primary Examiner*—Hieu T Vo
(74) *Attorney, Agent, or Firm*—Morgan & Finnegan, LLP

(57) ABSTRACT

A fuel injection control apparatus of an internal combustion engine is disclosed. This apparatus is provided with a crank angle detector that includes a signal rotor having a number of tooth portions and a toothless portion. The crank angle detector outputs a first signal corresponding to each tooth portion and a second signal corresponding to the toothless portion. A control computer selectively carries out a first calculation process for calculating the timing of fuel injection using the first signal and a second calculation process for calculating the timing of fuel injection using the second signal. When carrying out the second calculation process, the control computer calculates the timing of fuel injection using the length of time gained by dividing the length of time gained through detection of the toothless portion by the number of tooth portions which can be aligned in the toothless portion.

5 Claims, 9 Drawing Sheets

FUEL INJECTION CONTROL APPARATUS OF INTERNAL COMBUSTION ENGINE

BACKGROUND OF THE INVENTION

The present invention relates to a fuel injection control apparatus of an internal combustion engine where the timing of fuel injection is calculated on the basis of a signal outputted from a crank angle detector.

Japanese Laid-Open Patent Publication No. 2002-303199 discloses a crank angle detector for detecting the rotational angle of the crankshaft of an internal combustion engine, that is to say, the crank angle. This crank angle detector includes a rotor with teeth made of a magnetic body which is attached to the crankshaft, that is to say, a signal rotor, and a magnet pickup coil. A number of teeth are provided on the outer periphery of the signal rotor at equal angular intervals. In addition, a toothless portion is created in a portion of the outer periphery of the signal rotor by leaving out teeth. The toothless portion is used to detect the reference position for the crank angle.

Usually the timing of fuel injection (the time when injection starts and the time when injection is completed) is first set as a crank angle. Next, the tooth portion (reference tooth portion), which is a reference, is set on the basis of this crank angle, and at the same time, the standby period after the point in time when a detection signal corresponding to the above described reference tooth portion is detected and before the point in time when fuel injection starts or is completed is determined. When fuel injection control is carried out, the reference tooth portion is detected by the magnet pickup coil. After that, fuel injection starts or is completed, at the point in time when it is determined that the standby period has elapsed through measurement by a timer.

In addition, the above described standby period changes in accordance with the rotational speed of the crankshaft. Concretely, the rotational speed of the crankshaft is obtained from the length of time between two detected signals which respectively correspond to any two adjacent tooth portions before the reference tooth portion, and the thus obtained rotational speed is regarded as the rotational speed of the crankshaft at that time, and the standby period is determined with the reference tooth portion as the starting point. In the case where the length of time between the detected signals corresponding to two adjacent tooth portions is short, the obtained rotational speed of the crankshaft becomes high, and therefore, the standby period with the reference tooth portion as the starting point also becomes short.

In an internal combustion engine with eight cylinders as those disclosed in Japanese Laid-Open Patent Publication No. 2002-303199 and Japanese Laid-Open Patent Publication No. 2005-315107, the timing interval between one fuel injection and the previous fuel injection corresponds to a crank angle of 90°. Meanwhile, in the case of an internal combustion engine with a relatively small number of cylinders, for example, four cylinders, the timing interval between one fuel injection and the previous fuel injection corresponds to a crank angle of approximately 180°. Accordingly, engines having a greater number of cylinders have a shorter interval between fuel injections. In addition, the number of internal combustion engines in which pilot injection is carried out before the main fuel injection or post injection is carried out after the main injection has been increasing in recent years. In the case where pilot injection or post injection is carried out in an engine having a relatively great number of cylinders, the interval between fuel injections becomes considerably short. Therefore, in cases where the timing of fuel injection is set in the above described manner, a detection signal corresponding to the toothless portion must sometimes be used, when the standby period, which is the base for the calculation of injection timing, is obtained. However, the length of time, which is obtained on the basis of the detection signal corresponding to the toothless portion, is basically longer than the length of time between detection signals corresponding to two adjacent tooth portions, and therefore, the detection signal corresponding to the toothless portion cannot be used as it is.

SUMMARY OF THE INVENTION

An objective of the present invention is to make it possible to calculate the appropriate timing for fuel injection using a signal rotor having a toothless portion.

In order to achieve the above described object, one aspect of the present invention provides a fuel injection control apparatus of an internal combustion engine having a plurality of cylinders. The apparatus includes a fuel injection apparatus for injecting fuel into the cylinders, a crank angle detector, and a control section. The crank angle detector includes a signal rotor having a plurality of tooth portions aligned along the circumference at intervals of a constant angle and a toothless portion provided in an angular range which is greater than the interval at which the tooth portions are aligned. The crank angle detector outputs a first signal corresponding to each of the tooth portions and a second signal corresponding to the toothless portion as the signal rotor rotates. The control section calculates a time required for the signal rotor to rotate by a predetermined angle using a signal outputted from the crank angle detector and calculates the timing of fuel injection using the calculated time. The control section selectively carries out a first calculation process for calculating the timing of fuel injection using the first signal outputted from the crank angle detector and a second calculation process for calculating the timing of fuel injection using the second signal outputted from the crank angle detector. When carrying out the second calculation process, the control section calculates the timing of fuel injection using the length of time gained by dividing the length of time gained through detection of the toothless portion by the number of tooth portions which can be aligned in the toothless portion at the constant intervals.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the following, a first embodiment of the present invention is described in reference to FIGS. 1A to 5.

Figure 1A:
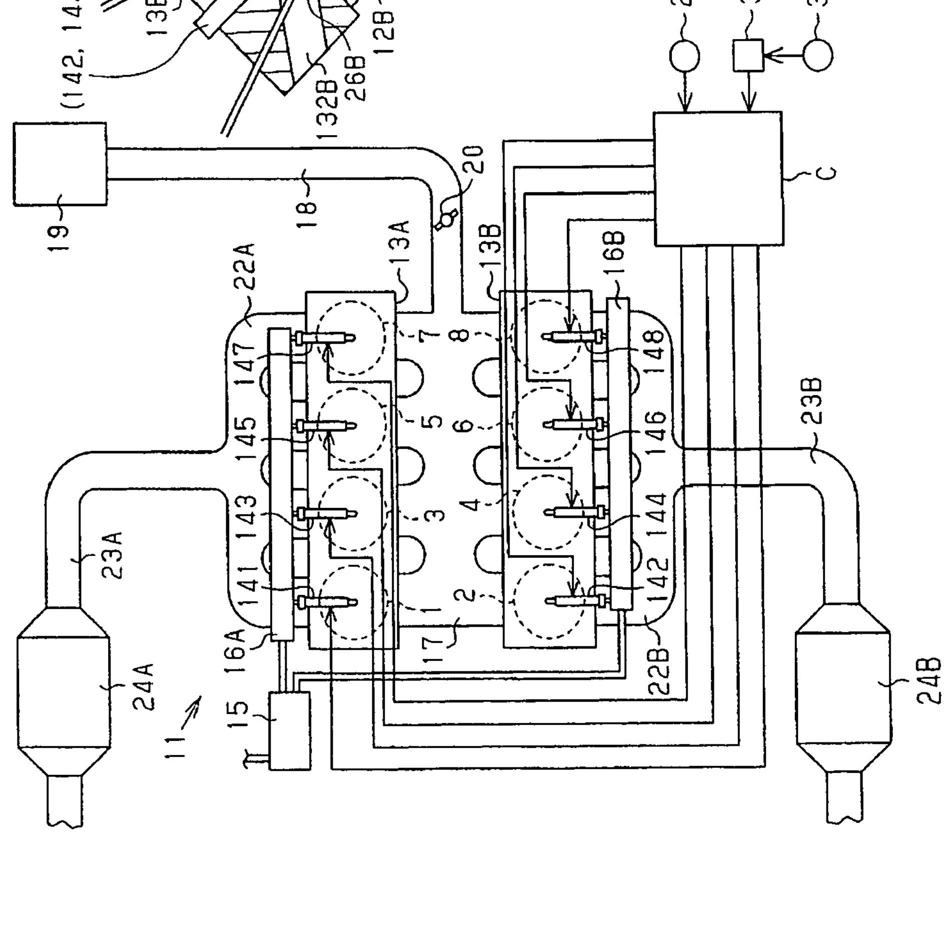
FIG. 1A is a schematic diagram showing an internal combustion engine according to a first embodiment of the present invention.

As shown in FIG. 1A, a diesel engine 11 mounted in a vehicle is provided with a number of cylinders 1, 2, 3, 4, 5, 6, 7 and 8. This engine 11 is a V type 8-cylinder four-cycle engine. The cylinders 1, 3, 5 and 7 form a first cylinder group and the cylinders 2, 4, 6 and 8 form a second cylinder group. Fuel injection nozzles 141, 143, 145 and 147 are attached to a cylinder head 13A corresponding to the first cylinder group, so as to correspond to cylinders 1, 3, 5 and 7, respectively. Fuel injection nozzles 142, 144, 146 and 148 are attached to a cylinder head 13B corresponding to the second cylinder group, so as to correspond to cylinders 2, 4, 6 and 8, respectively. Fuel is supplied to the fuel injection nozzles 141 to 148 through a fuel pump 15 and common rails 16A and 16B. The fuel injection nozzles 141 to 148 inject fuel into the corresponding cylinders 1 to 8. The fuel pump 15, the common rails 16A and 16B, and the fuel injection nozzles 141 to 148 form a fuel injection apparatus which injects fuel into a number of cylinders in an internal combustion engine.

An intake manifold 17 is connected to the two cylinder heads 13A and 13B. The intake manifold 17 is connected to an intake passage 18, and the intake passage 18 is connected to an air cleaner 19. A throttle valve 20 is provided in the intake passage 18. The throttle valve 20 adjusts the amount of air flow which is taken into the intake passage 18 through the air cleaner 19. The degree of opening of the throttle valve 20 is adjusted as the acceleration pedal, not shown, is operated. The degree to which the acceleration pedal is stepped on is detected by an acceleration pedal detector 21 for detecting the degree to which the acceleration pedal is stepped on.

Exhaust manifolds 22A and 22B are connected to the two cylinder heads 13A and 13B, respectively. An exhaust passage 23A is connected to the exhaust manifold 22A, and an exhaust passage 23B is connected to the exhaust manifold 22B. An exhaust purification apparatus 24A is provided in the exhaust passage 23A, and an exhaust purification apparatus 24B is provided in the exhaust passage 23B. The exhaust purification apparatuses 24A and 24B have, for example, a NOx catalyst. Exhaust gas which is discharged from the cylinders 1, 3, 5 and 7 is released into the air through the exhaust manifold 22A, the exhaust passage 23A and the exhaust purification apparatus 24A. Exhaust gas which is discharged from the cylinders 2, 4, 6 and 8 is released into the air through the exhaust manifold 22B, the exhaust passage 23B and the exhaust purification apparatus 24B.

Figure 1B:
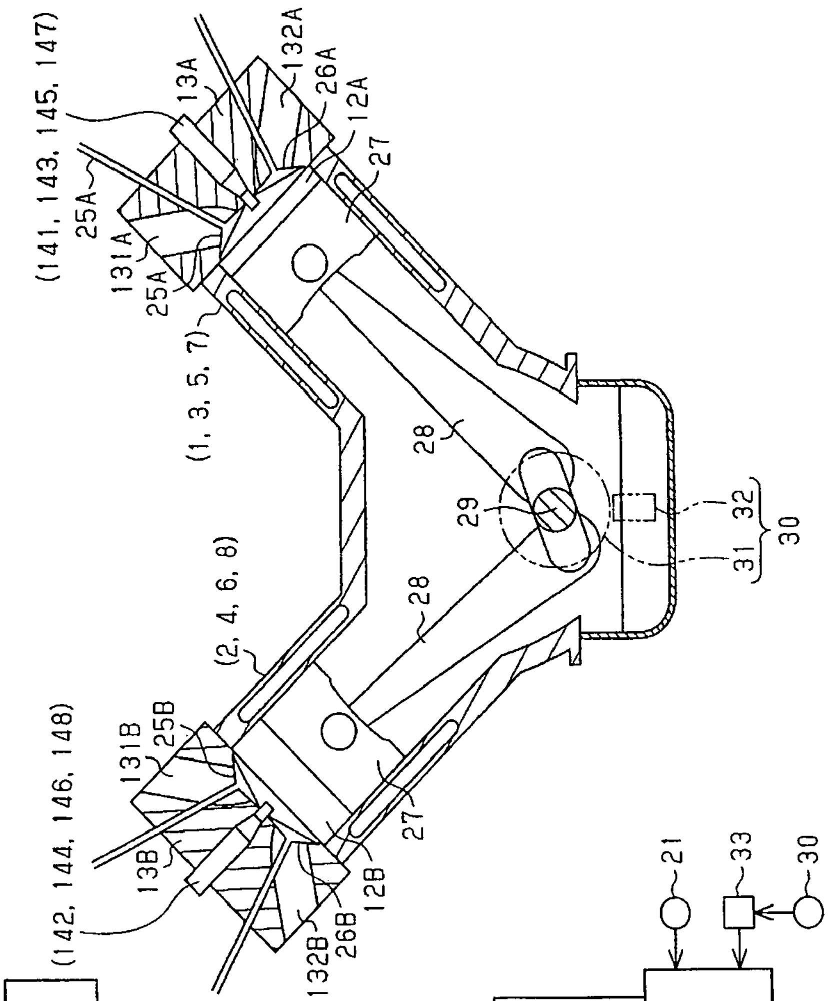
FIG. 1B is a cross-sectional side view showing the internal combustion engine of FIG. 1A.

As shown in FIG. 1B, intake ports 131A and exhaust ports 132A are formed in the cylinder head 13A so as to correspond to the respective cylinders 1, 3, 5 and 7, and intake ports 131B and exhaust ports 132B are formed in the cylinder head 13B so as to correspond to the respective cylinders 2, 4, 6 and 8. Each of the intake ports 131A and 131B has a first end connected to the combustion chamber 12A or 12B within the corresponding cylinder 1 to 8 and a second end connected to the corresponding branch line of the intake manifold 17. Each of the exhaust ports 132A has a first end connected to the corresponding combustion chamber 12A and a second end connected to the corresponding branch line of the exhaust manifold 22A. Each of the exhaust ports 132B has a first end connected to the corresponding combustion chamber 12B and a second end connected to the corresponding branch line of the exhaust manifold 22B.

Each of the intake ports 131A is selectively opened and closed by a corresponding intake valve 25A, and each of the intake ports 131B is selectively opened and closed by a corresponding intake valve 25B. Each of the exhaust ports 132A is selectively opened and closed by a corresponding exhaust valve 26A, and each of the exhaust ports 132B is selectively opened and closed by a corresponding exhaust valve 26B. Pistons 27 which define the combustion chambers 12A and 12B inside the cylinders 1 to 8 are linked to the crankshaft 29 via connecting rods 28. The reciprocating motion of the pistons 27 is converted to the rotational motion of the crankshaft 29 via the connecting rods 28. The rotational angle of the crankshaft 29, that is to say, the crank angle, is detected by a crank angle detector 30.

Figures 2A, 2B, 2C:
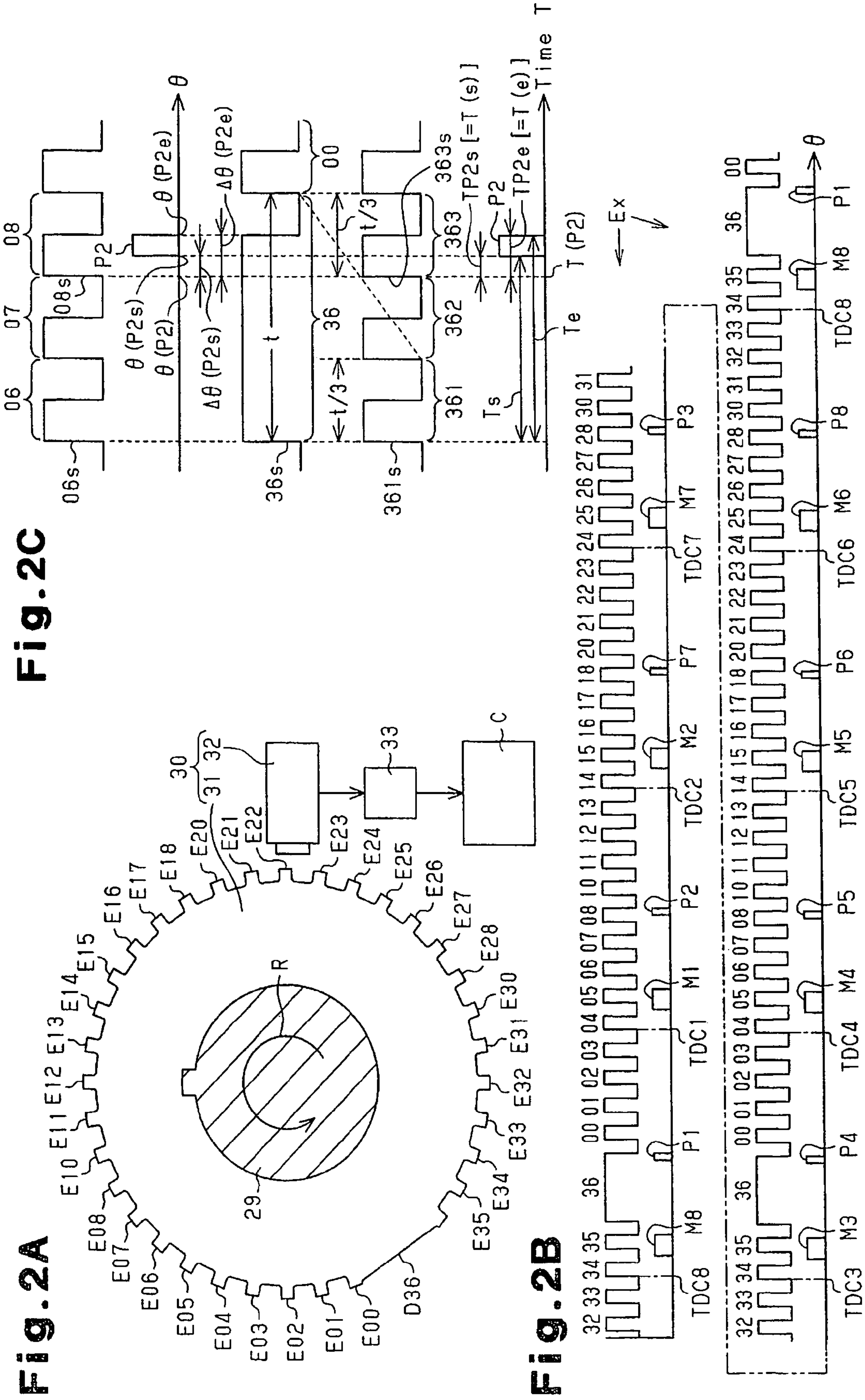
FIG. 2A is a schematic diagram showing a crank angle detector provided in the engine of FIG. 1B.
FIG. 2B is a timing chart showing a waveform gained from the signal outputted from the crank angle detector of FIG. 2A.
FIG. 2C is a timing chart showing a main portion of FIG. 2B.

As shown in FIG. 2A, the crank angle detector 30 includes a signal rotor 31 which is secured to the crankshaft 29 and an electromagnetic induction type pickup coil 32. The signal rotor 31 rotates together with the crankshaft 29 in the direction of arrow R. A number of tooth portions E00 to E08, E10 to E18, E20 to E28 and E30 to E35 are aligned in order around the periphery of the signal rotor 31. A toothless portion D36 is provided on the periphery of the signal rotor 31. The pickup coil 32 outputs a voltage signal as the signal rotor 31 rotates. The voltage signal outputted from the pickup coil 32 is sent to a waveform shaping section 33. The waveform shaping section 33 shapes the voltage signal sent from the pickup coil 32 to a waveform Ex in pulse form (see FIG. 2B), which is then outputted to a control computer C.

FIG. 2B shows the waveform Ex in pulse form which is outputted from the waveform shaping section 33 when the signal rotor 31 rotates for two or more turns. The horizontal axis θ indicates the crank angle. TDC1 to TDC8 indicate the respective crank angles when the pistons 27 in the cylinders 1 to 8 are located at the top dead center during the compression stroke. In the present embodiment, fuel is supplied in the order of cylinders 1, 2, 7, 3, 4, 5, 6 and 8.

The pulse signals (first signals) 00 to 08 correspond to the detection of tooth portions E00 to E08, respectively. The pulse signals (first signals) 10 to 18 correspond to the detection of tooth portions E10 to E18, respectively. The pulse signals (first signals) 20 to 28 correspond to the detection of tooth portions E20 to E28, respectively. The pulse signals (first signals) 30 to 35 correspond to the detection of tooth portions E30 to E35, respectively. The pulse signal (second signal) 36 corresponds to the detection of the toothless portion D36.

The respective symbols M1 to M8 indicate the period of the main fuel injection from the fuel injection nozzles 141 to 148 in the cylinders 1 to 8.

The respective symbols P1 to P8 indicate the period of the pilot fuel injection form the fuel injection nozzles 141 to 148 in the cylinders 1 to 8.

Information on the degree to which the pedal is stepped on gained by the acceleration pedal detector 21 and information on the crank angle gained by the crank angle detector 30 are sent to the control computer C. The control computer C calculates the timing of fuel injection (the time when injection starts and the time when injection is completed) in the fuel injection nozzles 141 to 148 on the basis of the parameters indicating the operating state of the engine, for example information on the degree to which the pedal is stepped on and information on the crank angle.

Figure 4:
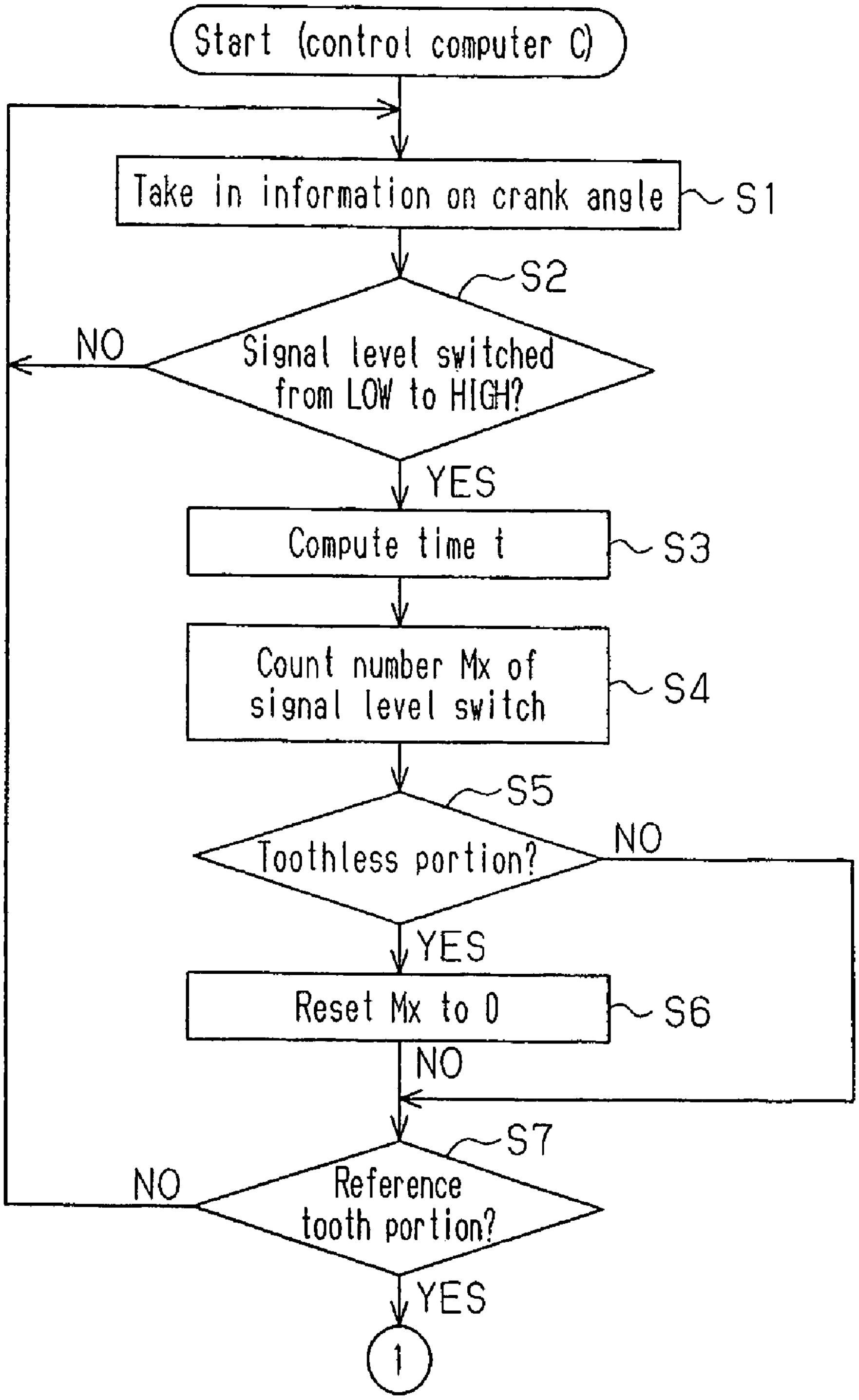
FIG. 4 is a flowchart showing a fuel injection control procedure according to the first embodiment.
Figure 5:
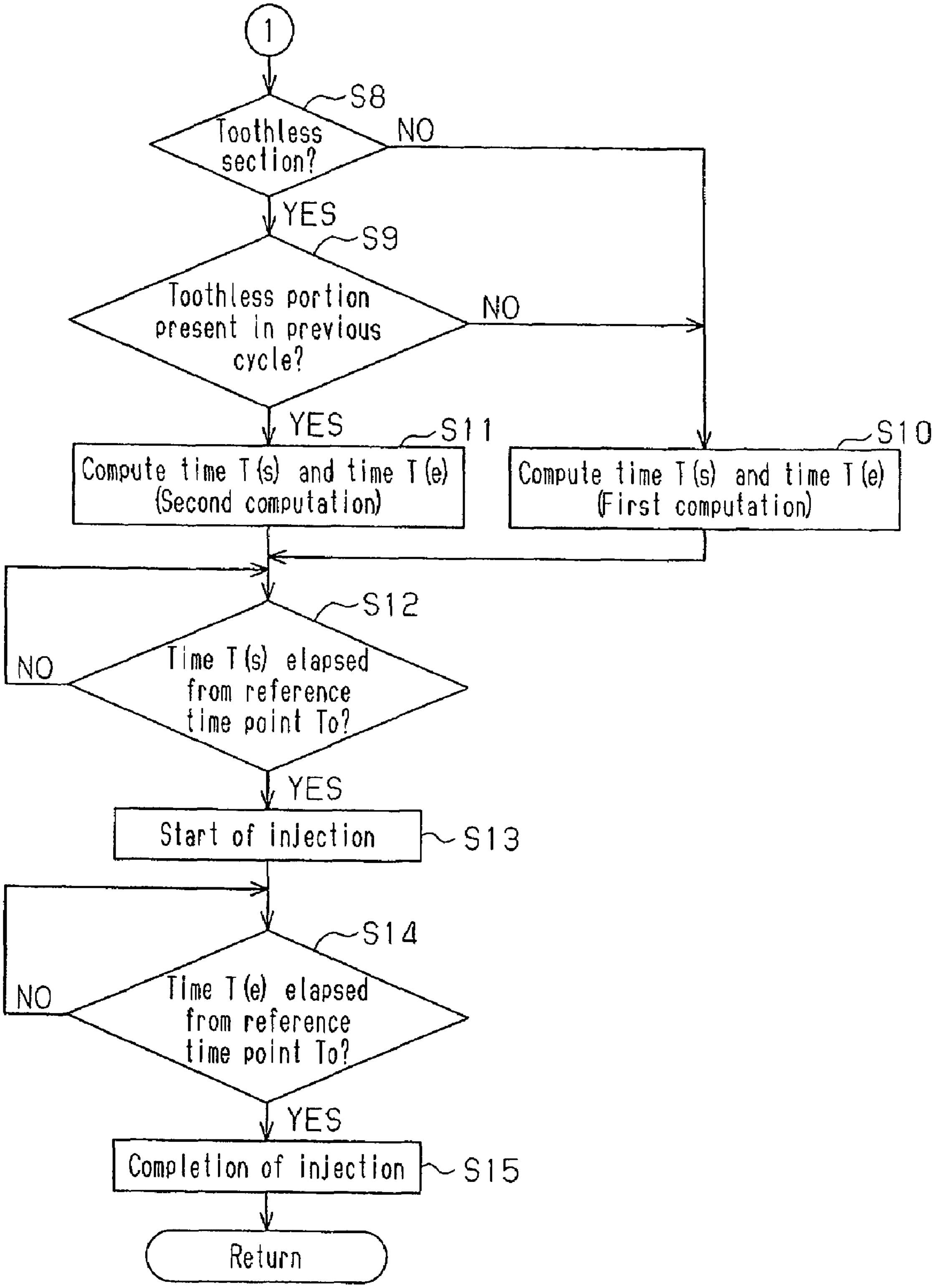
FIG. 5 is a flowchart showing the fuel injection control procedure according to the first embodiment.

FIGS. 4 and 5 are flowcharts showing the fuel injection control procedure. In the following, fuel injection control is described following this flowchart.

As shown in FIG. 4, in Step S1, the control computer C takes in and stores information on the crank angle, that is to say, the voltage signal indicated by the waveform Ex, for every predetermined control period. In Step S2, the control computer C determines whether the level of this voltage signal has switched from a low level to a high level (whether the waveform signal has risen). In the case where the signal level fails to switch from a low level to a high level in Step S2, the control computer C proceeds to Step S1.

In the case where the signal level switches from a low level to a high level in Step S2, the control computer C proceeds to Step S3 and stores the elapsed time t between one switch in the signal level and the previous switch in the signal level. On the basis of this time t, the rotational speed of the crankshaft 29 can be obtained. In the present description, "switch in the signal level" means that the signal level switches from a low level to a high level unless otherwise stated. Next, in Step S4, the control computer C counts the number of switches (number of counts) Mx in the signal level. As described below, this number of switches Mx is counted in such a manner that the rise of the pulse signal 01 is counted as the first switch.

In Step S5, the control computer C determines whether the toothless portion D36 has been detected. Concretely, the control computer C determines whether the time t elapsed between one switch in the signal level and the previous switch in the signal level is longer than a predetermined time. The above described predetermined time is longer than the time between two pulse signals corresponding to adjacent normal tooth portions. In addition, the above described predetermined time is a linear variable which varies in accordance with the rotational speed of the engine. In the case where the toothless portion D36 is detected in Step S5, the control computer C proceeds to Step S6 so as to reset the number of counts Mx to 0, and then proceeds to Step S7.

On the other hand, in the case where the toothless portion D36 is not detected, the control computer C proceeds to Step S7 without going through Step S6. That is to say, in the case where a rise of the pulse signal 00 corresponding to the tooth portion E00 is detected in Step S2, for example, the rise of the previous pulse signal is the rise of the pulse signal 36 corresponding to the toothless portion D36. In this case, affirmative determination is made in Step S5, and therefore, the number of counts Mx is reset to zero in Step S6. Accordingly, afterwards, every time the present routine is carried out, the number of counts Mx is incremented with a rise of the pulse signal 01 corresponding to the tooth portion E01 as the first count. This means that the tooth portion can be identified using the number of counts Mx.

In Step S7, the control computer C determines whether the number of counts Mx corresponds to a reference tooth portion. In the example of FIG. 2B, the tooth portions E04, E08, E14, E18, E24, E28 and E34 corresponding to the pulse signals 04, 08, 14, 18, 24, 28 and 34 are set as reference tooth portions.

The reference tooth portions are tooth portions which are the reference when the time when fuel injection starts and the time when fuel injection is completed are set. That is to say, the timing of fuel injection (the time when injection starts and the time when injection is completed) in each cylinder is obtained as a crank angle on the basis of the operating state of the engine in the procedure for determining the timing of fuel injection, which is carried out separately from the routine in FIGS. 4 and 5. This crank angle is converted to the standby time with the point in time when the reference tooth portion is detected as the starting point. Accordingly, fuel injection starts or is completed when the standby time has elapsed after the detection of the reference tooth portion.

In the case where the number of counts Mx does not correspond to a reference tooth portion, that is to say, in the case where no reference tooth portion is detected, the control computer C proceeds to Step S1. On the other hand, in the case where the number of counts Mx corresponds to a reference tooth portion, that is to say, in the case where a reference tooth portion is detected, the control computer C proceeds to Step S8 in FIG. 5 and determines whether this reference tooth portion is located in the toothless section. The toothless section corresponds to sections of pulse signals 06 to 08, 16 to 18 and 26 to 28 shown in FIG. 2B. The reference tooth portion E04 corresponding to the pulse signal 04, for example, is not located in the toothless section, while the reference tooth portion E08 corresponding to the pulse signal 08 is located in the toothless section. In the case where a reference tooth portion is located in the toothless section in Step S8, the control computer C proceeds to Step S9 and determines whether the toothless portion D36 is in the previous injection cycle. The injection cycle corresponds to an angular range (90° in the present embodiment) which is gained by dividing the crank angle corresponding to one turn of the crankshaft 29, that is, 360°, with the crank angle when the piston 27 is located at the top dead center as the base point, by half of the total number of cylinders (8 in the present embodiment). That is to say, the injection cycle corresponds to the angular range between adjacent TDCk's (k is an integer of 1 to 8). In FIG. 2B, for example, the angular range between the crank angle TDC8 when the eighth cylinder 8 is located at the top dead center during the compression stroke and the crank angle TDC1 when the first cylinder 1 is located at the top dead center during the compression stroke corresponds to one injection cycle. Information on detection of a tooth portion in the previous injection cycle (injection cycle one cycle before the injection cycle corresponding to the timing of injection at the time) is a past signal gained in the previous injection cycle.

Figure 3:
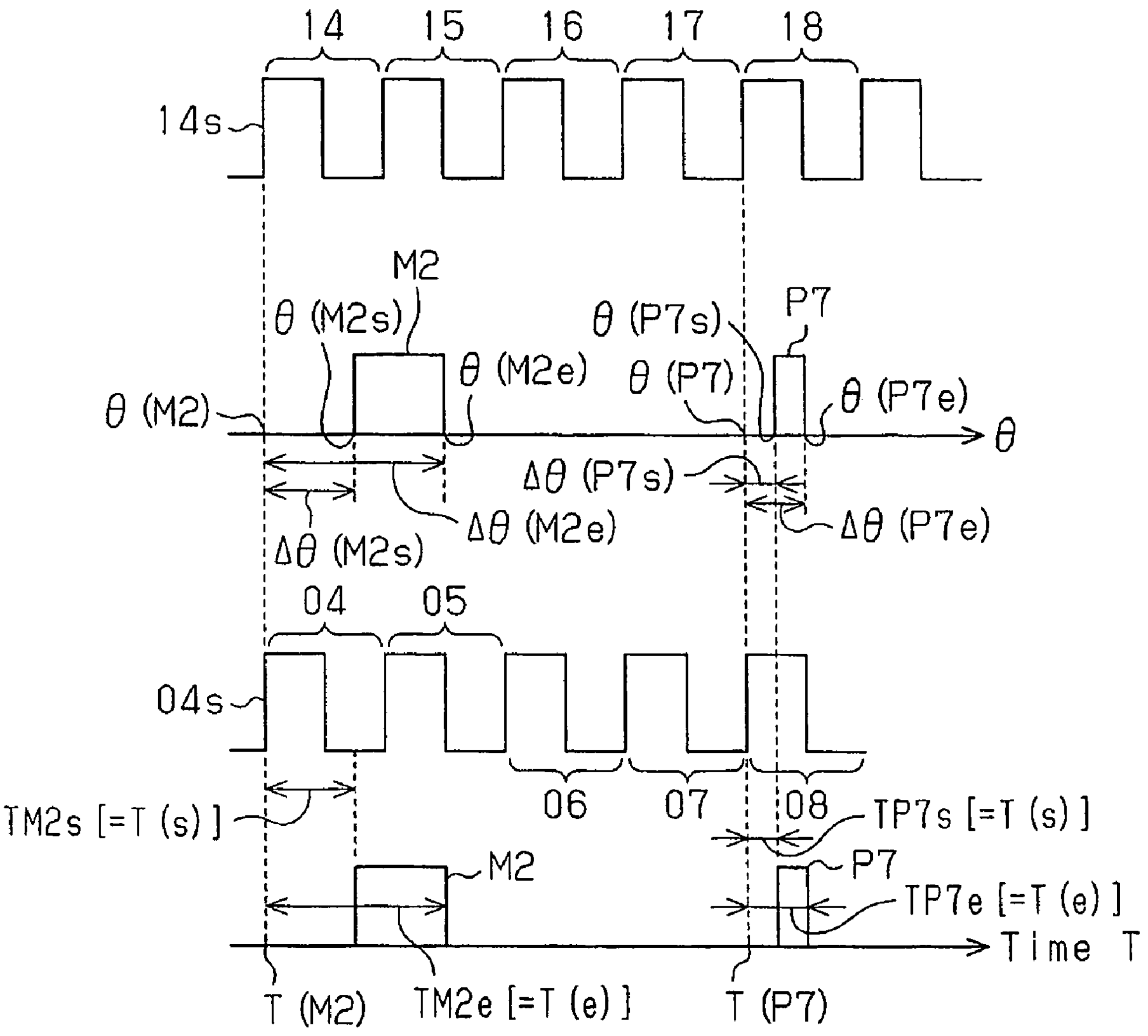
FIG. 3 is a timing chart showing a main portion of FIG. 2B.

In the case where no reference tooth portion is in the toothless section in Step S8, or in the case where the toothless portion D36 is not in the previous injection cycle in Step S9, the control computer C proceeds to Step S10 and calculates the standby time T(s) before the start of injection and the standby time T(e) after the completion of injection using information on detection of a tooth portion and information on detection of the rotational speed in the previous injection cycle. In the example of FIG. 3, T(s)=TM2s or T(s)=TP7s, and T(e)=TM2e or T(e)=TP7e.

In the example of FIG. 3, when the crank angle θ is θ(M2s), the main injection into the second cylinder 2 starts, and when the crank angle θ is θ(M2e), the main injection into the second cylinder 2 is completed. The crank angle θ(M2s) when the main injection starts and the crank angle θ(M2e) when the main injection is completed are obtained on the basis of the operating state of the engine, as described above. Δθ(M2s) indicates the angular range from the crank angle θ(M2) of the rising portion 14*s* (start point) of the pulse signal (tooth portion detecting signal) 14 to the crank angle θ(M2s) when the main injection starts. Δθ(M2e) indicates the angular range from the above described crank angle θ(M2) to the crank angle θ(M2e) when the main injection is completed. These angular ranges Δθ(M2s) and Δθ(M2e) are standby angular ranges which are set with the crank angle (reference crank angle) θ(M2) corresponding to the reference tooth portion E14 as the base point. In the example of FIG. 3, in Step S10, information on detection of a tooth portion in the previous injection cycle is pulse signals 04 to 13 in FIG. 2B, and information on detection of the rotational speed in the previous injection cycle is the rotational speed calculated using the pulse signals 04 to 13.

In addition, in the example of FIG. 3, when the crank angle θ is θ(P7s), pilot injection into the seventh cylinder 7 starts, and when the crank angle θ is θ(P7e), pilot injection into the seventh cylinder is completed. The crank angle θ(P7s) when pilot injection starts and the crank angle θ(P7e) when pilot injection is completed are obtained on the basis of the operating state of the engine, as described above. Δθ(P7s) indicates the angular range from the crank angle θ(P7) in the portion where the pulse signal 18 rises to the crank angle θ(P7s) when pilot injection starts. Δθ(P7e) indicates the angular range from the above described crank angle θ(P7) to the crank angle θ(P7e) when pilot injection is completed. These angular ranges Δθ(P7s) and Δθ(P7e) are standby angular ranges which are set with the crank angle θ(P7) corresponding to the reference tooth portion E18 as the base point. In the example of FIG. 3, in Step S10, information on detection of a tooth portion in the previous injection cycle is pulse signals 04 to 13 in FIG. 2B, and information on detection of the rotational speed in the previous injection cycle is the rotational speed calculated using the pulse signals 04 to 13.

Negative determination in Step S8 or Step S9 corresponds to a process for selecting a first calculation process in which injection timing is calculated using a signal for a normal tooth portion outputted from the crank angle detector 30. In Step S10, the control computer C substitutes the above described standby angular range with the length of time using information on detection of a tooth portion in the previous injection cycle and information on detection of the rotational speed. Concretely, in the example of FIG. 3, the standby angular ranges Δθ(M2s) and Δθ(P7s) are substituted with the standby time before the start of injection TM2s and TP7s, and the standby angular ranges Δθ(M2e) and Δθ(P7e) are substituted with the standby time after the completion of injection TM2e and TP7e. T(M2) in FIG. 3 is the reference time point when the crank angle (reference crank angle) θ(M2) corresponding to the reference tooth portion E14 is substituted with the time display. T(P7) in FIG. 3 is the reference time point when the crank angle (reference crank angle) O(P7) corresponding to the reference tooth portion E18 is substituted with the time display.

In the case where affirmative determination is made in Step S9, the control computer C proceeds to Step S11. In FIG. 2B, for example, the toothless portion D36 is located in the injection cycle corresponding to the angular range between the crank angle TDC8 when the eighth cylinder 8 is at the top dead center during the compression stroke and the crank angle TDC1 when the first cylinder 1 is at the top dead center during the compression stroke. In other words, the pulse signal 36 corresponding to the toothless portion D36 is in the injection cycle in the section from the pulse signal 34 corresponding to the reference tooth portion E34 to the pulse signal 04 corresponding to the reference tooth portion E04. Accordingly, it is determined that the toothless portion D36 is in the previous injection cycle when the reference tooth portion 08 in the toothless section is detected in the next injection cycle (section between the pulse signal 04 and the pulse signal 14). In Step S11, the control computer C calculates the standby time before the start of injection T(s) and the standby time after the completion of injection T(e) using information on detection of a tooth portion and information on detection of the rotational speed in the previous injection cycle. In the example of FIG. 2C, T(s)=TP2s and T(e)=TP2e.

In the example of FIG. 2C, when the crank angle θ is θ(P2s), pilot injection into the second cylinder 2 starts, and when the crank angle θ is θ(P2e), pilot injection into the second cylinder 2 is completed. The crank angle θ(P2s) when pilot injection starts and the crank angle θ(P2e) when pilot injection is completed are obtained on the basis of the operating state of the engine, as described above. Δθ(P2s) indicates the angular range from the crank angle θ(P2) in the portion 08*s* where the pulse signal 08 rises to the crank angle θ(P2s) when pilot injection starts. Δθ(P2e) indicates the angular range from the above described crank angle θ(P2) to the crank angle θ(P2e) when pilot injection is completed. These angular ranges Δθ(P2s) and Δθ(P2e) are standby angular ranges which are set with the crank angle θ(P2) corresponding to the reference tooth portion E18 as the base point. In the example of FIG. 2C, in Step S11, information on detection of the toothless portion in the previous injection cycle is pulse signals 34 to 03 in FIG. 2B, and information on detection of the rotational speed in the previous injection cycle is the rotational speed calculated using the pulse signals 34 to 03.

In Step S1, the length of time (t/3 in the present embodiment) gained by dividing the length of time t corresponding to the toothless portion D36 by the number of normal tooth portions (3 in the present embodiment) which would normally be in the toothless portion D36 is used as information on detection of a tooth portion, to calculate the standby time before the start of injection and the standby time after the completion of injection. The number of normal tooth portions which would normally be in the toothless portion D36, in other words, the number of normal tooth portions which could be placed in the toothless portion D36, corresponds to the value Z gained by dividing the crank angular range (30° in the present embodiment) of the signal gained through detection of the toothless portion D36 by the crank angular width (10° in the present embodiment) of the signal gained through detection of a reference tooth portion. In the present embodiment, the number Z of normal tooth portions which would normally be in the toothless portion D36 is 3. In the following, the number of normal tooth portions which would normally be in the toothless portion is sometimes referred to as the number of missing teeth.

The affirmative determination in Step S9 corresponds to the process for selecting the second calculation process for calculating the timing of injection using the signal of the toothless portion outputted from the crank angle detector 30. In Step S11, the control computer C substitutes the angular range of the above described standby time with the length of time using information on detection of a tooth portion and information on detection of the rotational speed in the previous injection cycle. Concretely, in the example of FIG. 2C, the standby angular range Δθ(P2s) is substituted with the standby time before the start of injection TP2s, and the standby angular range Δθ(P2e) is substituted with the standby time after the completion of injection TP2e. T(P2) in FIG. 2C is a reference time point gained by substituting the crank angle (reference crank angle) O(P2) corresponding to the reference tooth portion E08 with a time display. The standby time before the start of injection TP2s can be represented by the following formula (1), and the standby time after the completion of injection TP2e can be represented by the following formula (2).

$$\Delta\theta(P2s)/TP2s=10°/(t/3) \quad (1)$$

$$\Delta\theta(P2e)/TP2e=10°/(t/3) \quad (2)$$

The standby time Ts from the portion 06s, where the pulse signal 06 rises, to the start of pilot injection can be represented by the following formula (3), and the standby time Te from the rising portion 06s to the completion of pilot injection can be represented by the following formula (4).

$$\begin{aligned} Ts &= (t/3)\times 2+TP2s \\ &= (t/3)\times 2+\Delta\theta(P2s)\times(t/3)/10° \end{aligned} \quad (3)$$

$$\begin{aligned} Te &= (t/3)\times 2+TP2e \\ &= (t/3)\times 2+\Delta\theta(P2e)\times(t/3)/10° \end{aligned} \quad (4)$$

The control computer C calculates the standby time TP2s and TP2e using the formulas (1) and (2).

After the process in Step S10 or Step S11, in Step S12, the control computer C determines whether the standby time before the start of injection T(s) has elapsed after the reference time point To. The reference time point To is the reference time point T(M2) or the reference time point T(P7) in the example of FIG. 3, and the reference time point T(P2) in the example of FIG. 2C. In the case where the standby time after the start of injection T(s) has elapsed after the reference time point To, the control computer C proceeds to Step S13 and starts fuel injection through the corresponding fuel injection nozzle. In the example of FIG. 2C, fuel injection (pilot injection) through the fuel injection nozzle 142 of the second cylinder 2 starts. Next, in Step 14, the control computer C determines whether the standby time after the completion of injection T(e) has elapsed after the reference time point To. In the case where the standby time after the completion of injection T(e) has elapsed after the reference time point To, the control computer C proceeds to Step 15 and completes fuel injection through the corresponding fuel injection nozzle. In the example of FIG. 2C, fuel injection (pilot injection) through the fuel injection nozzle 142 of the second cylinder 2 is completed. Then, the control computer C proceeds to Step S1.

Figure 6:
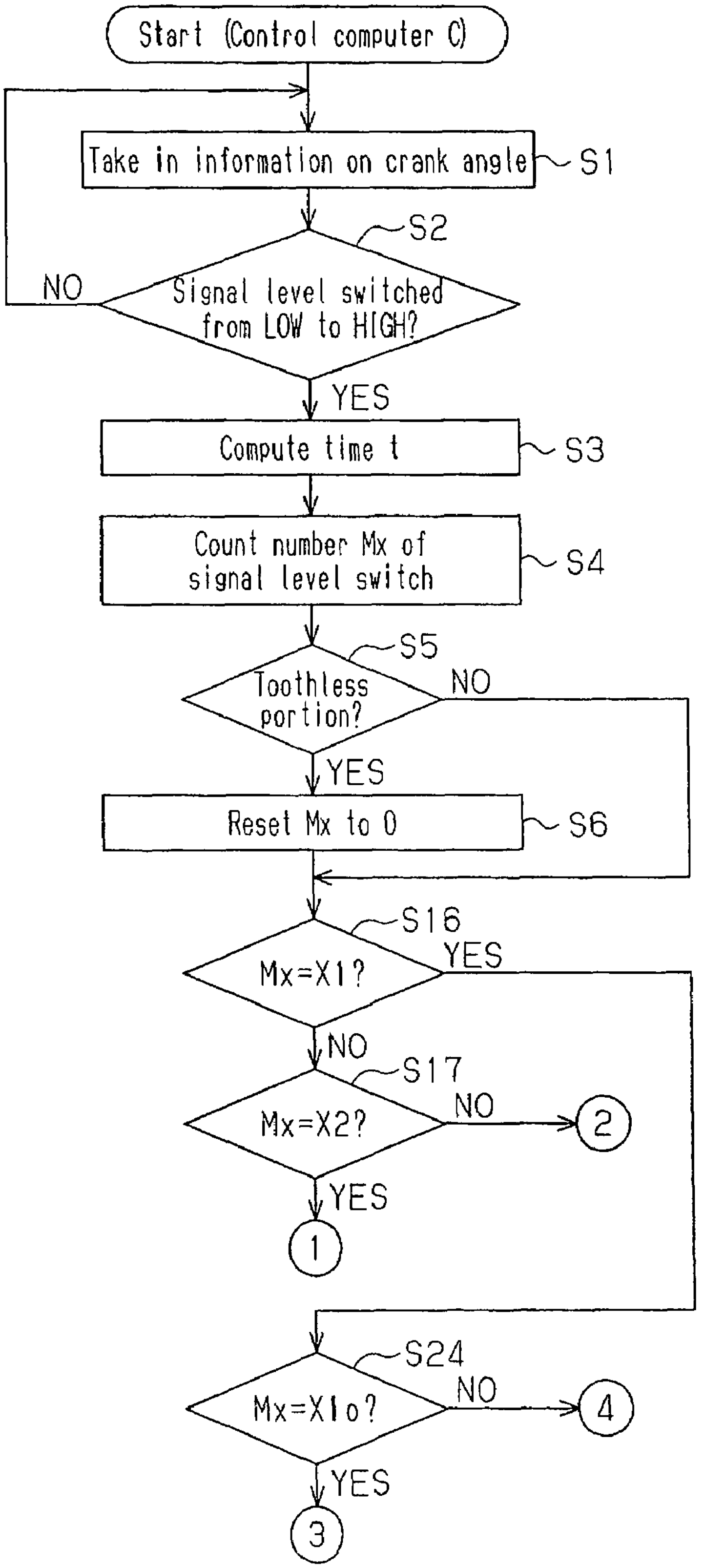
FIG. 6 is a flowchart showing a fuel injection control procedure according to a second embodiment.

Next, a second embodiment according to the present invention is described in reference to FIGS. 2A, 2B, 2C and 6 to 9. The configuration of the apparatus and the manner of fuel injection in the second embodiment are the same as in the first embodiment. Steps S1 to S6 in the flowchart of FIG. 6 are the same as Steps S1 to S6 in the flowchart for the first embodiment, and therefore, description thereof is omitted.

As shown in FIG. 6, in the case where the toothless portion D36 is not detected in Step S5, or in the case where the number of counts Mx is reset to zero in Step S6, the control computer C determines whether the number of counts Mx is a preset value X1 in Step S16. In the present embodiment, a case where the value X1 is 9, 18, 27 or 0 is described as an example. As shown in FIG. 2B, pilot injection starts within the width of the pulse signals 08, 18 and 28 corresponding to the number of counts Mx, 8, 17 and 26, which are one value smaller than the value of X1, 9, 18 and 27, respectively. The pulse signals 08, 18 and 28 are gained when the corresponding tooth portions E08, E18 and E28 are detected. Each of the tooth portions E08, E18 and E28 is set as a reference tooth portion for the timing of pilot injection. In addition, in the case where the toothless portion D36 is detected in Step S5, the count value Mx is reset from 34 to zero in Step S6, and it is determined that the count value Mx is a value X1 of zero in Step S16. In this case, pilot injection starts within the width of the pulse signal 36 corresponding to the number of counts Mx, 33, which is one smaller than the value 34 before being reset to zero. The pulse signal 36 is gained when the toothless portion D36 is detected. The toothless portion D36 is set as a reference tooth portion for the timing of pilot injection.

In the case where the number of counts Mx is not the value X1 in Step S16, the control computer C proceeds to Step S17 and determines whether the number of counts Mx is a preset value X2. In the present embodiment, the value X2 is obtained in the following formula. n is an integer of 1 to 4.

$$X2=5+9\times(n-1)$$

The value X2 obtained in this formula is, concretely, 5, 14, 23 or 32. As shown in FIG. 2B, the main injection starts within the width of the pulse signals 04, 14, 24 and 34 corresponding to the number of counts Mx, 4, 13, 22 and 31, which are one smaller than the value X2 of 5, 14, 23 and 32, respectively. The pulse signals 04, 14, 24 and 34 are gained when the corresponding tooth portions E04, E14, E24 and E34 are detected. The tooth portions E04, E14, E24 and E34 are set as reference tooth portions for the timing of the main injection.

Figure 7:
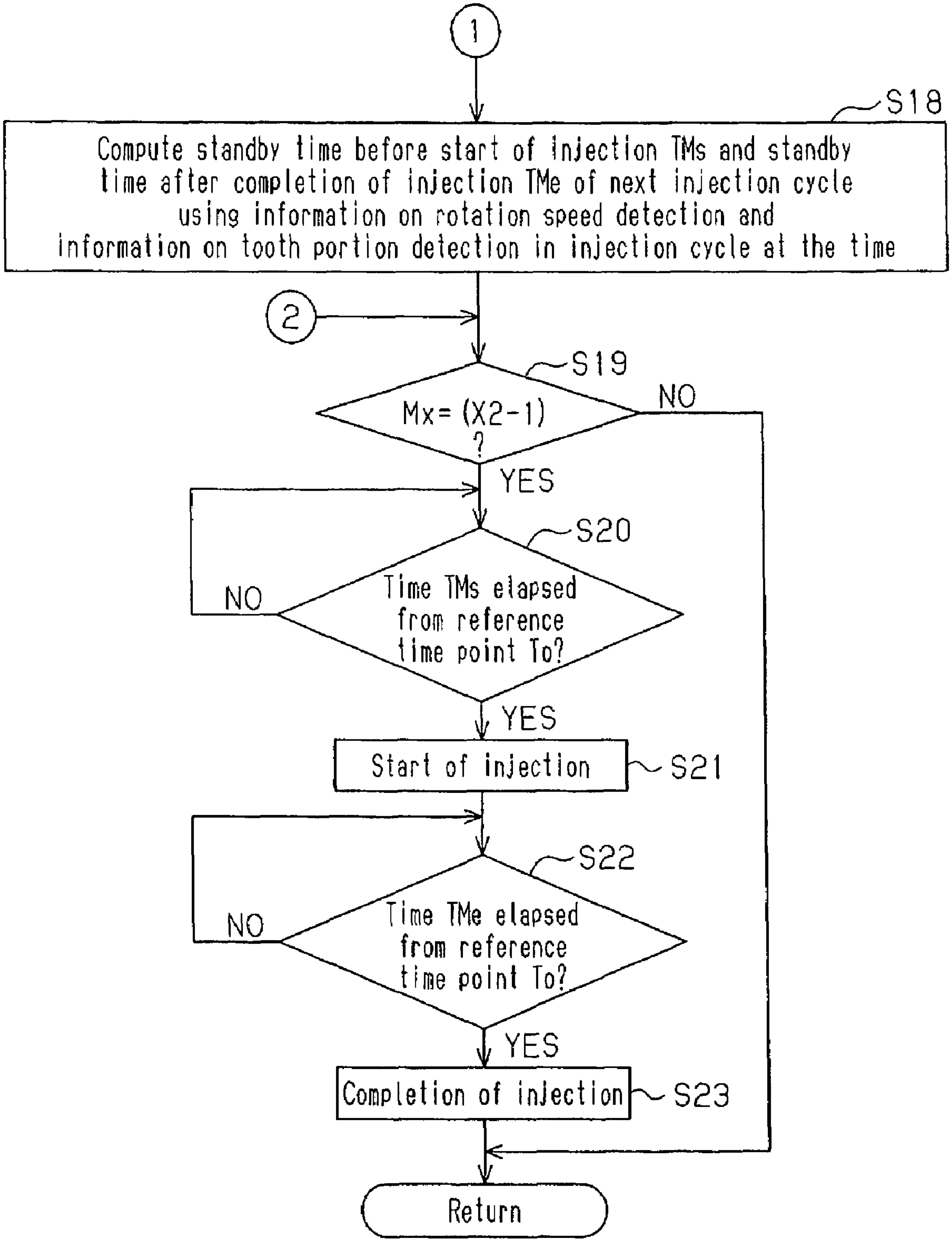
FIG. 7 is a flowchart showing the fuel injection control procedure according to the second embodiment.
Figure 8:
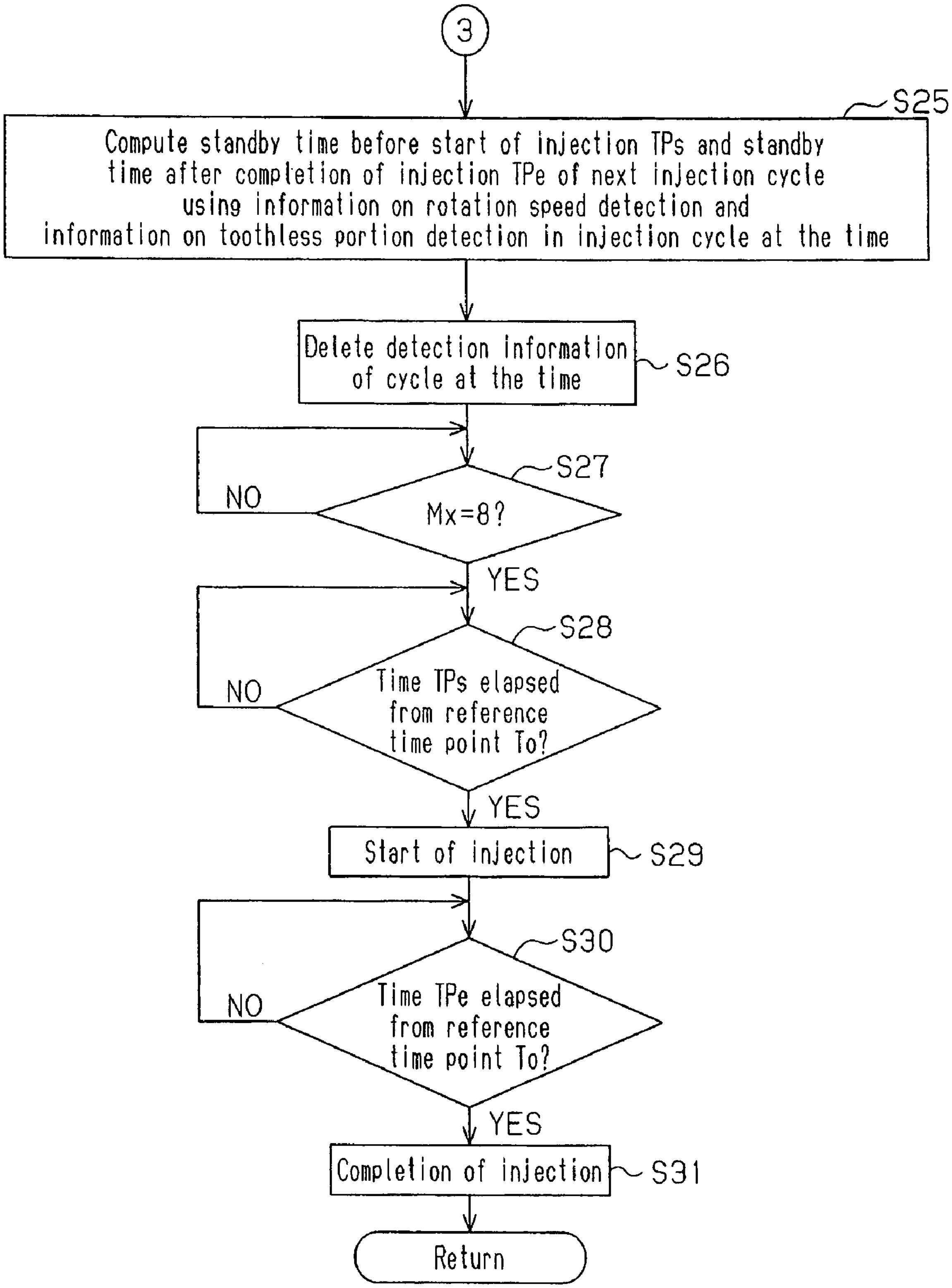
FIG. 8 is a flowchart showing the fuel injection control procedure according to the second embodiment.

In the case where the number of counts Mx is the value X2 in Step S17, the control computer C proceeds to Step S18 in FIG. 7 and calculates the standby time before the start of injection TMs and the standby time after the completion of injection TMe in the next injection cycle using information on detection of a tooth portion and information on detection of the rotational speed in the injection cycle at the time.

The negative determination in Step S16 corresponds to the process for selecting the first calculation process for calculating the timing of injection using a signal of a normal tooth portion outputted from the crank angle detector 30. In the case of the main injection in the second cylinder 2, as shown in FIG. 3, for example, in Step S18, the control computer C substitutes the standby angular range in the next injection cycle with the length of time using information on detection of a tooth portion and information on detection of the rotational speed in the injection cycle at the time. Concretely, in the example of FIG. 3, the standby angular range Δθ(M2s) is substituted with the standby time before the start of injection TM2s, and the standby angular range Δθ(M2e) is substituted with the standby time after the completion of injection TM2e. T(M2) in FIG. 3 is the reference time point To gained by substituting the crank angle (reference crank angle) θ(M2) corresponding to the reference tooth portion E14 with a time display.

After the process in Step S18, in Step S19, the control computer C determines whether the number of counts Mx is a preset value (X2-1). The value (X2-1) is, concretely, 4, 13, 22 or 31. In the case where the number of counts Mx is not the value (X2-1), the control computer C proceeds to Step S1.

Meanwhile, in the case where the number of counts Mx is the value (X2-1) in Step S19, the control computer C proceeds to Step S20 and determines whether the standby time before the start of injection TMs has elapsed after the reference time point To. The reference time To is the reference time point T(M2) in the example of FIG. 3. In the case where the standby time before the start of injection TMs has elapsed after the reference time point To, the control computer C proceeds to Step S21 and starts fuel injection through the corresponding fuel injection nozzle. In the example of FIG. 3, fuel injection (main injection) through the fuel injection nozzle 142 of the second cylinder 2 starts. Next, in Step S22, the control computer C determines whether the standby time after the completion of injection TMe has elapsed after the reference time point To. In the case where the standby time after the completion of injection TMe has elapsed after the reference time point To, the control computer C proceeds to Step S23 and completes fuel injection through the corresponding fuel injection nozzle. In the case of FIG. 3, fuel injection (main injection) through the fuel injection nozzle 142 of the second cylinder 2 is completed. Then, the control computer C proceeds to Step S1.

Meanwhile, in the case where the number of counts Mx is not the value X2 in Step S17 in FIG. 6, the control computer C proceeds to Step S19 in FIG. 7.

In addition, in the case where the number of counts Mx is the value X1 in Step S16 in FIG. 6, the control computer C proceeds to Step S24 and determines whether the number of counts Mx is a preset value X1o. In the present embodiment, the value X1o is zero. As described above, the pulse signal 36 corresponding to the number of counts Mx, 33, which is one smaller than the value 34 before being reset to zero in Step S6, is gained through detection of the toothless portion D36. In the case where the number of counts Mx is the value X1o, the control computer C proceeds to Step S25 in FIG. 8 and calculates the standby time before the start of injection TPs and the standby time after the completion of injection TPe of the next pilot injection using information on detection of the toothless portion and information on detection of the rotational speed in the injection cycle at the time.

In the process in Step S25, the pulse signal 36 gained through detection of the toothless portion D36 is substituted with temporary signals 361, 362 and 363 (see FIG. 2C). The temporary signals 361, 362 and 363 have a length of time corresponding to the length of time t/Z (t/3 in the present embodiment) gained by dividing the length of time t of the pulse signal 36 by the number of missing teeth Z (3 in the present embodiment).

The affirmative determination in Step S24 corresponds to the process for selecting the second calculation process for calculating the timing of injection using the signal of the missing tooth portion outputted from the crank angle detector 30. In Step S25, the control computer C substitutes the standby angle range in the next cycle of injection with the length of time using information on detection of a tooth portion and information on detection of the rotational speed in the cycle of injection at the time. Concretely, in the example of FIG. 2C, the standby angle range Δθ(P2s) is substituted with the standby time before the start of injection TP2s, and the standby angle range Δθ(P2e) is substituted with the standby time after the completion of injection TP2e. That is to say, the control computer C calculates the standby time TP2s and TP2e using the above described formulas (1) and (2).

After the process in Step S25, in Step S26, the control computer C deletes information on detection of the injection cycle at the time (information on detection of the rotational speed, information on detection of a tooth portion and information on detection of the toothless portion).

After the process in Step S26, the control computer C proceeds to Step S27 and determines whether the number of counts Mx is 8. In the case where the number of counts Mx is 8, the control computer C proceeds to Step S28 and determines whether the standby time before the start of injection TPs has elapsed after the reference time point To. In the case where the standby time before the start of injection TPs has elapsed after the reference time point To in Step S28, the control computer C proceeds to Step S29 and starts fuel injection through the fuel injection nozzle (fuel injection nozzle 142 in the example shown in FIG. 2C). Next, in Step S30, the control computer C determines whether the standby time after the completion of injection TPe has elapsed after the reference time point To. In the case where the standby time after the completion of injection TPe has elapsed after the reference time point To, the control computer C proceeds to Step S31, and completes fuel injection through the corresponding fuel injection nozzle. In the example of FIG. 2C, fuel injection (pilot injection) through the fuel injection nozzle 142 of the second cylinder 2 is completed. Then, the control computer C proceeds to Step S1.

Figure 9:
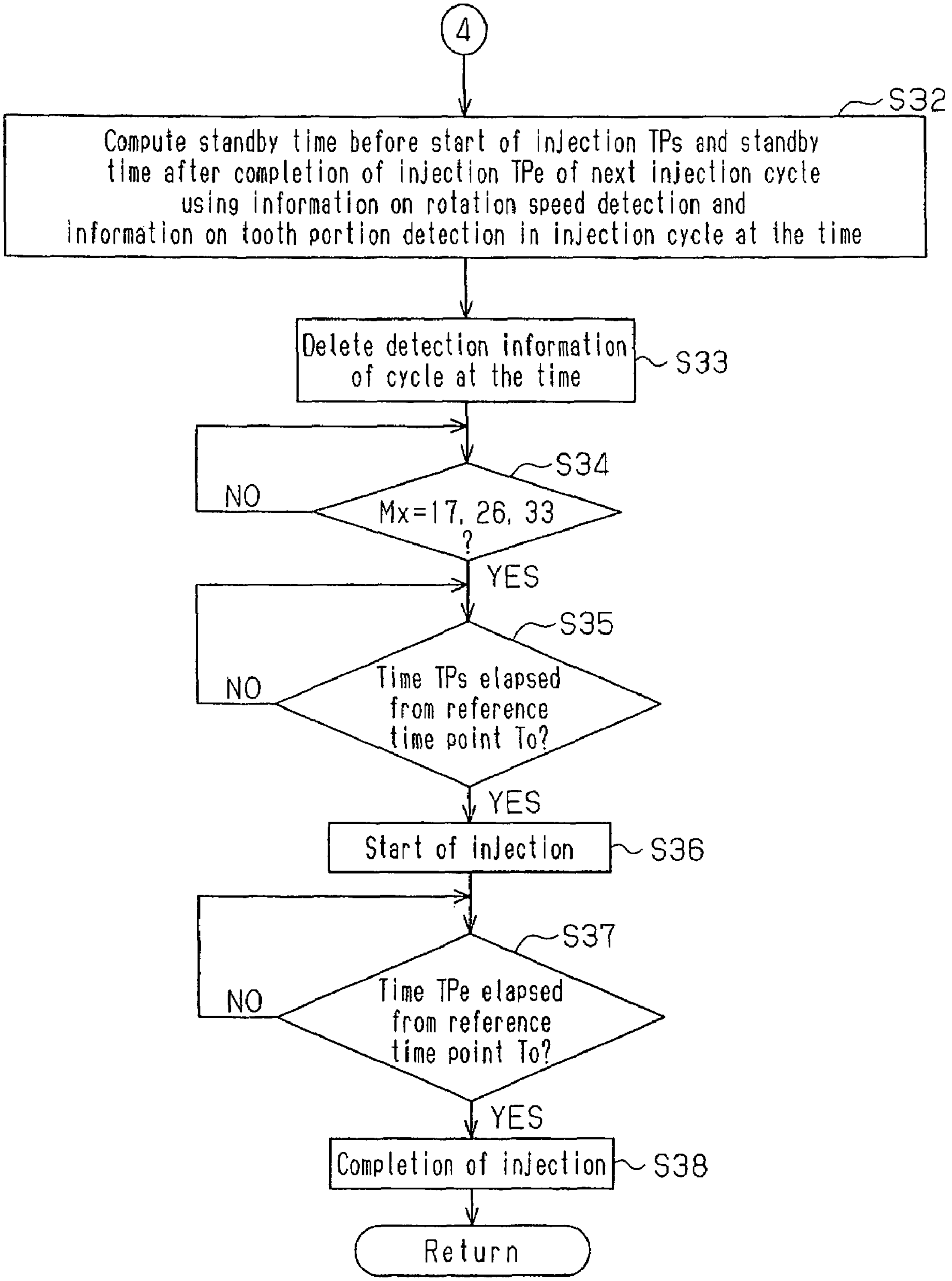
FIG. 9 is a flowchart showing the fuel injection control procedure according to the second embodiment.

In the case where the number of counts Xx is not the value X1o in Step S24 in FIG. 6, that is to say, in the case where the number of counts Mx is 9, 18 or 27, the control computer C proceeds to Step S32 in FIG. 9 and calculates the standby time before the start of injection TPs and the standby time after the completion of injection TPe of pilot injection in the next injection cycle using information on detection of a tooth portion and information on detection of the rotational speed in the injection cycle at the time.

The negative determination in Step S24 corresponds to the process for selecting the first calculation process for calculating the timing of injection using the signal gained through detection of a normal tooth portion before detection of a reference tooth portion which is the reference for the timing of injection. In Step S32, the control computer C substitutes the standby angular range in the next cycle of injection with the length of time using information on detection of a tooth portion and information on detection of the rotational speed in the injection cycle at the time. Concretely, in the example of FIG. 3, the standby angular range Δθ(P7s) is substituted with the standby time before the start of injection TP7s, and the standby angular range Δθ(P7e) is substituted with the standby time after the completion of injection TP7e. T(P7) in FIG. 3 is the reference time point To, which is gained by substituting the crank angle (reference crank angle) θ(P7) with a time display.

After the process in Step S32, in Step S33, the control computer C deletes information on detection of the injection cycle at the time (information on detection of the rotational speed and information on detection of a tooth portion).

After the process in Step S33, the control computer C proceeds to Step S34, and determines whether the number of counts Mx is 17, 26 or 33. In the case where the number of counts Mx is 17, 26 or 33, the control computer C proceeds to Step S35 and determines whether the standby time before the start of injection TPs has elapsed after the reference time point To. In the example of FIG. 3, the reference time point To is the reference time point T(P7). In the case where the standby time before the start of injection TPs has elapsed after the reference time point To, the control computer C proceeds to Step S36 and starts fuel injection (pilot injection) through the fuel injection nozzle (the fuel injection nozzle 147 in the example shown in FIG. 3). Next, in Step S37, the control computer C determines whether the standby time after the completion of injection TPe has elapsed after the reference time point To. In the case where the standby time after the completion of injection TPe has elapsed after the reference time point To, the control computer C proceeds to Step S38 and completes fuel injection through the corresponding fuel injection nozzle. In the example of FIG. 3, fuel injection (pilot injection) through the fuel injection nozzle 147 of the seventh cylinder 7 is completed. Then, the control computer C proceeds to Step S1.

In the second embodiment, past signals used to calculate the timing of the main injection in the respective cylinders 1 to 8 do not become a signal corresponding to the toothless portion. Accordingly, the first calculation process is selected as the process for calculating the timing of the main injection in the respective cylinders 1 to 8. In the same manner, past signals used to calculate the timing of pilot injection in the respective cylinders 1, 3, 4 and 6 to 8 do not become a signal corresponding to the toothless portion. Accordingly, the first calculation process is selected as the process for calculating the timing of pilot injection in the respective cylinders 1, 3, 4 and 6 to 8. However, past signals used to calculate the timing of pilot injection in the cylinders 2 and 5 become a signal corresponding to the toothless portion. Accordingly, the second calculation process is selected as the process for calculating the timing of pilot injection in the cylinders 2 and 5.

In the first and second embodiments, the control computer C calculates the time required for the signal rotor 31 to rotate from the reference position to the crank angle corresponding to the timing of fuel injection using a signal outputted from the crank angle detector 30, and at the same time, controls the timing of fuel injection using the calculated time. In addition, the control computer C selects either the first calculation process for calculating the timing of injection (the standby time before the start of injection and the standby time after the completion of injection) using the signal of a normal tooth portion outputted from the crank angle detector 30 or the second calculation process for calculating the timing of injection (the standby time before the start of injection and the standby time after the completion of injection) using the signal of the toothless portion outputted from the above described crank angle detector 30. Furthermore, in the case where the second calculation process is selected, the control computer C calculates the timing of injection using the time gained by dividing the time gained through detection of the above described toothless portion by the number of normal teeth portions which would normally be in the toothless portion 36D.

The following advantages are gained in the first and second embodiments.

(1) The timing of injection can be calculated using the past pulse signal 36 gained through detection of the toothless portion D36. In this case, the pulse signal 36 is substituted with temporary signals 361, 362 and 363. The respective temporary signals 361, 362 and 363 have a length of time corresponding to the length of time t/Z (t/3 in the present embodiment) which is gained by dividing the length of time t of the pulse signal 36 by the number of missing teeth Z (3 in the present embodiment). Then, one of the temporary signals 361, 362 and 363 for the number of missing teeth is used to calculate the timing of injection. In this manner, it becomes possible to calculate the timing of injection using a past pulse signal gained through detection of the toothless portion D36, by adopting temporary signals 361, 362 and 363.

(2) The past pulse signals gained through detection of tooth portions and the toothless portion are pulse signals gained in the injection cycle one cycle before the injection cycle in which fuel injection is carried out at the time. In the case where the main injection M1 or the pilot injection P2 is the fuel injection at the time, for example, the injection cycle at the time corresponds to the angular range from TDC1 to TDC2, while the injection cycle one cycle before corresponds to the angular range from TDC8 to TDC1. The rotational speed gained from the past pulse signals corresponds precisely to the rotational speed in the injection cycle in which the fuel injection at the time is carried out. Accordingly, the past pulse signals gained in the injection cycle one cycle before the injection cycle in which the fuel injection at the time is carried out are appropriate for calculating the timing of the main injection and the timing of pilot injection.

(3) The greater the number of cylinders, the greater the possibility becomes of a past pulse signal corresponding to the toothless portion having to be used when the timing of fuel injection is calculated. An 8 cylinder internal combustion engine, of which the number of cylinders is great, is appropriate as an object to which the present invention is applied.

The present invention may be implemented in the below described embodiments.

The past pulse signal used to calculate the timing of injection may be gained within the injection cycle corresponding to the angular range for one cylinder, which is gained by dividing the crank angle for one turn by half the total number of cylinders.

The pulse signal gained in the injection cycle two or more cycles before the injection cycle in which the fuel injection at the time is carried out may be used to calculate the timing of injection.

Post injection is sometimes carried out after the main injection. The present invention may be applied also in the case where the timing of this post injection is calculated using a past pulse signal gained through detection of the toothless portion.

In the case where the timing of injection is calculated using a past pulse signal gained through detection of the toothless portion, the present invention may also be applied to internal combustion engines other than those having 8 cylinders (for example those having 4 cylinders, 6 cylinders, 10 cylinders or 12 cylinders).

The present invention may be applied to after injection or post injection, for example, in addition to main injection and pilot injection.

In the control illustrated in FIGS. 4 and 5 in the first embodiment, Steps S8 to S11 may be independent, as a flow different from the flow in FIGS. 4 and 5. That is to say, the flow in FIGS. 4 and 5 may be used as a flow for carrying out injection, and Steps S8 to S11, which are separated as a different flow, may be used as a flow for determining the timing of injection.

It should be apparent to those skilled in the art that the present invention may be embodied in many other specific forms without departing from the spirit or scope of the invention. Particularly, it should be understood that the invention may be embodied in the following forms.

The present examples and embodiments are to be considered as illustrative and not restrictive and the invention is not to be limited to the details given herein, but may be modified within the scope and equivalence of the appended claims.

The invention claimed is:

1. A fuel injection control apparatus of an internal combustion engine having a plurality of cylinders, the apparatus comprising:

a fuel injection apparatus for injecting fuel into the cylinders;

a crank angle detector including a signal rotor having a plurality of tooth portions aligned along the circumference at intervals of a constant angle and a toothless portion provided in an angular range which is greater than the interval at which the tooth portions are aligned, wherein the crank angle detector outputs a first signal corresponding to each of the tooth portions and a second signal corresponding to the toothless portion as the signal rotor rotates; and a control section for calculating a time required for the signal rotor to rotate by a predetermined angle using a signal outputted from the crank angle detector and calculating the timing of fuel injection using the calculated time, wherein the control section selectively carries out a first calculation process for calculating the timing of fuel injection using the first signal outputted from the crank angle detector and a second calculation process for calculating the timing of fuel injection using the second signal outputted from the crank angle detector, and wherein, when carrying out the second calculation process, the control section calculates the timing of fuel injection using the length of time gained by dividing the length of time gained through detection of the toothless portion by the number of tooth portions which can be aligned in the toothless portion at the constant intervals.

2. The apparatus according to claim 1, wherein the control section calculates the time corresponding to a predetermined angle by which the signal rotor rotates using a signal gained in a cycle of injection one cycle before the cycle of injection in which fuel injection is carried out at the time, and calculates the timing of fuel injection in the injection cycle at the time using the calculated time.

3. The apparatus according to claim 1, wherein the control section carries out the injection cycle repeatedly with fuel injection into each cylinder as one injection cycle, wherein, in each injection cycle, the control section sets, as a reference crank angle, a crank angle at the point in time when a tooth portion that has been set as a reference tooth portion in advance is detected, and sets a standby angular range from the reference crank angle to the crank angle when fuel injection starts and a standby angular range from the reference crank angle to the completion of fuel injection, and wherein the control section substitutes these standby angular ranges with independent lengths of time on the basis of a signal gained from the crank angle detector in the previous injection cycle.

4. The apparatus according to claim 1, wherein, when the second calculation process is carried out, the second signal is substituted with temporary signals of which the number is equal to the number of tooth portions which can be aligned in the toothless portion, such that the start point of the first temporary signal coincides with the start point of the second signal, and temporary signals, excluding the first temporary signal, are allocated at equal intervals following the first temporary signal.

5. The apparatus according to claim 1, wherein the number of cylinders is six or greater.

* * * * *

UNITED STATES PATENT AND TRADEMARK OFFICE

CERTIFICATE OF CORRECTION

PATENT NO. : 7,527,039 B2
APPLICATION NO. : 11/983486
DATED : May 5, 2009
INVENTOR(S) : Yoshiya Yamamura et al.

It is certified that error appears in the above-identified patent and that said Letters Patent is hereby corrected as shown below:

In the Specification

Column 7, line 48, please delete "O(P7)" and insert therefore -- $\theta$(P7) --;

Column 8, line 27, please delete "S1" and insert therefore -- S11 --;

Signed and Sealed this

Twenty-fifth Day of August, 2009

David J. Kappos

David J. Kappos
*Director of the United States Patent and Trademark Office*